April 28, 1959   H. E. MORROW   2,883,738
METHOD OF MAKING ANNULAR ELEMENTS FOR
POWER-TRANSMISSION CHAINS
Filed March 9, 1955

INVENTOR.
HARRY E. MORROW,
BY
ATTORNEYS.

United States Patent Office 2,883,738
Patented Apr. 28, 1959

2,883,738

METHOD OF MAKING ANNULAR ELEMENTS FOR POWER-TRANSMISSION CHAINS

Harry E. Morrow, Indianapolis, Ind., assignor to Diamond Chain Company, Inc., Indianapolis, Ind., a corporation of Indiana Application March 9, 1955, Serial No. 493,280

3 Claims. (Cl. 29—149.5)

In power-transmission chains of the roller type, the annular elements—i.e., the rollers and bushings—are commonly formed of lengths of flat stock rolled into a tubular form and sized externally by forcing them through circular dies. Exteriorly, annular elements so formed are not sufficiently cylindrical for all purposes, and it is therefore common, before hardening them, to grind their outer surfaces on centerless grinders. Because of the original departures from a true cylindrical form, the grinding operation frequently produces an external surface which departs to a material extent from concentricity with the inner surface, and the resultant variations in wall thickness cause a reduction in strength and interferes with accurate control of link-pitch. In spite of these detrimental features, the formation of chain rollers and chain bushings from flat stock has been widely practiced.

It is an object of this invention to improve the quality of annular chain elements formed from flat stock. More specifically, it is an object of the invention to provide a method by which annular chain elements, such as rollers and bushings, can be simply and economically formed to an accuracy not heretofore obtainable even with a grinding operation. Another object of the invention is to obtain more accurate control of the length of the assembled chain. A further object is to produce a chain bushing having a bore providing better bearing contact with the pin than is possessed by any prior bushing of which I am aware.

In carrying out the invention, a blank of appropriate length is cut from a strip of the desired width and bent into a circular or quasi-circular cross-section. The blank thus formed is gripped in a die having a cylindrical cavity the walls of which tightly embrace the element to force the ends of the blank together; and with the element so held, a ball or similar drift is forced through its bore. The diameter of the drift is so co-ordinated with the diameter of the die-cavity and the thickness of the stock that the passage of the drift through the element will create a substantial metal flow reducing the thickness of the element and increasing its length. In the case of a bushing, the ends of the blank may be notched intermediate their extent, the notches complementing each other in the finished bushing to provide a slot extending through the bushing-wall at the seam where the two ends of the blank meet. When such a bushing is subjected to a drifting operation with a drift having a limited axial extent of contact with the bushing wall, the presence of the slot reduces the pressure which would otherwise be exerted by the drift diametrically opposite the slot, thus causing the wall of the bushing opposite the seam to be of slightly greater thickness near the middle of the bushing than at the ends thereof. When such bushings are assembled in the bushing links of a chain with the seam and slot of each bushing directed toward the center of its bushing-link, the graduated thickness of the bushing wall opposite the slot increases the area of contact between the bushing and the chain-pin which it receives.

The accompanying drawing illustrates the invention:

Figure 1:
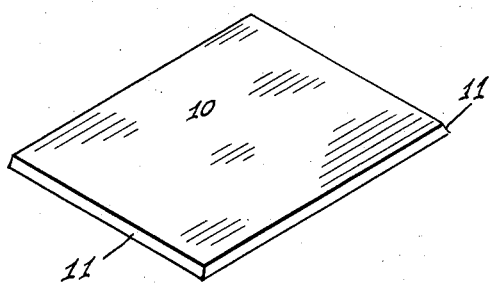
Fig. 1 is an isometric view of a blank adapted for use in the forming of a chain bushing.
Figure 2:
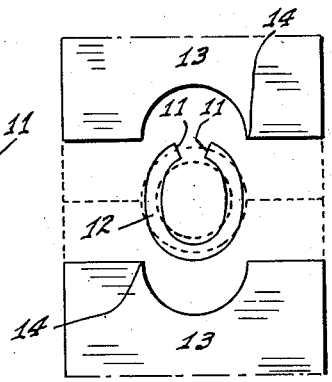
Fig. 2 is a plan view illustrating a partially formed bushing in association with the die which reduces it to circular cross-section and supports it exteriorly during the drifting operation.

In describing the invention below, I shall describe it as employed in the formation of bushings; but it is to be understood that some features of the method may be used in the production of chain rollers. In Fig. 1, I have illustrated at 10 a blank suitable for use in forming a chain bushing. Such blank is cut to the proper length from strip stock, preferably by a knife-like punch which leaves the end faces 11 of the blank beveled slightly and converging toward what will be the axis of the bushing. The blank 10, so cut to the proper length, is rolled or bent into a circular or quasi-circular cross-section. Preferably, as indicated at 12 in Fig. 2, the cross-section of the blank as initially formed is oval with the end faces 11 disposed in opposed relation at one end of the major axis; but the precise form of the rolled blank is relatively immaterial.

The blank formed as above described is placed between two dies 13 provided in their opposed faces with aligned semi-cylindrical recesses which complement each other when the dies are closed, as indicated in dotted lines, to form an accurately cylindrical recess. Whether or not the rolled blank 12 has the desired oval cross-section, it is so oriented around its axis that the seam defined by the opposed faces 11 will lie at or near the middle of the recess in one of the dies. If the rolled blank has the preferred oval cross-section, and is oriented as indicated, scoring of its outer surface by the edges 14 of the die-cavities will be prevented, as the blank will not obtain the full width of the die-cavities until the dies are closed.

Figure 3:
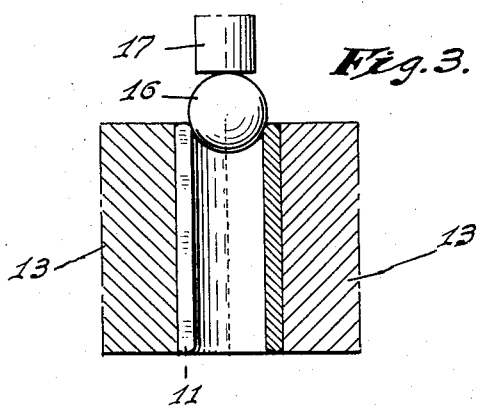
Fig. 3 is a vertical section illustrating the drifting operation.

With the dies 13 closed as indicated in Fig. 3 a drift is forced through the bushing. As shown, the drift is in the form of a hardened, accurately sized steel ball 16, which is forced through the bushing by a plunger 17 of smaller diameter. As will be apparent from the specific example hereinafter set forth, the size of the ball or other drift 16 is so co-ordinated with the thickness of the stock and the diameter of the die-cavity that forcing of the ball through the bushing will cause a flow of metal, creating a permanent reduction in the wall thickness of the bushing and an appreciable increase in its length. The metal flow resulting from passage of the drift through the bushing brings the opposed faces 11 into intimate contact with each other with the result that the minute irregularities originally present in the faces 11 cause a sort of keying action or effect which opposes axial displacement of one face relative to the other.

As a specific example of the formation of a chain bushing, I cite a bushing adapted for use in a chain of 2 inch pitch and 1¼ inches in width. The blank 10 for such a bushing may be cut to appropriate length from strip stock having a thickness of 0.116 inches and a width of about 1²³⁄₃₂. The material of the strip is desirably a carburizing grade of alloy steel, such for example as that identified as SAE 8620. The diameter of the die-cavity for such a bushing is 0.794 inch, and the drift used is a hardened steel ball having a diameter of 0.5725 inch, or approximately 0.010 inch greater than the internal diameter of the bushing as initially gripped between the dies. Forcing the ball drift through the bushing requires a pressure of about five tons. The exterior diameter of the finished bushing is that of the die-cavity, but the inner diameter of the bushing is approximately 0.5705 inch, and the drifting operation increases the length of the bushing by about 0.045 inch on the average.

Bushings formed as above indicated require no grinding, as their exterior surfaces are accurately cylindrical. The bore of the bushing is accurately circular in cross-section, and the wall-thickness is accurately controllable at all points. The interlocking between the opposed faces 11 which results from the flow of the metal, is an advantage in preventing relative axial displacement of those faces under forces which may be imposed on the bushing when it is forced into the link plates of a chain.

Figure 4:
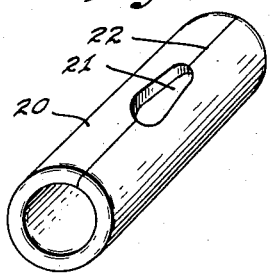
Fig. 4 is an isometric view of a bushing formed with a slot in its wall.

In the bushing 20 shown in Fig. 4, the ends of the blank from which the bushing was formed were provided intermediate their extent with notches which complement each other in the finished bushing to form an elongated slot 21 desirably symmetrical with reference to the seam 22. When the ball drift is forced through such a bushing, it first enters the unslotted end portion of the bushing where the bushing-wall, except for the closed seam 22, is continuous; and the pressure exerted by the ball against the bushing-metal will be substantially uniform throughout the circumference of the bushing. As the ball comes opposite the slot 21, however, it is relieved of pressure from the slotted side of the bushing. Accordingly, the ball, in its passage through the bushing, does not follow a straight line but instead follows a path which is curved in the manner exaggeratedly indicated by the chain line 24 in Fig. 5. In consequence, the wall of the bushing opposite the seam 22 will have a thickness which is somewhat greater at and near the middle of the bushing than at the ends of the bushing, again as exaggeratedly indicated at 25 in Fig. 5.

Figure 6:
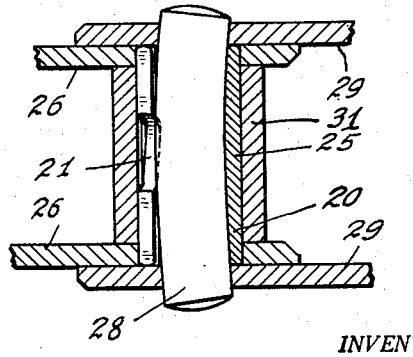
Fig. 6 is a fragmental longitudinal section through a joint in a chain under load, and illustrates in exaggerated fashion the co-operation between the bushing and the chain-pin which it receives.

In Fig. 6, I have illustrated the joint between a bushing-link and a pin-link of a power-transmitting chain to show an advantage which results from the drifting of slotted bushings in the manner just described. The bushing 20 is pressed into the pitch holes of the link plates 26 of a bushing-link, the bushing being so oriented about its axis that the slot 21 will be toward the middle of the link. The bushing rotatably receives a pin 28 pressed into the pitch holes of pin-link plates 29. When a chain so assembled is in operation, each pin 28 is subjected to a beam loading which causes it to bend as exaggeratedly indicated in Fig. 6. Because of this bending of the pin the axial variation in wall thickness on the load-bearing wall-portion of the bushing produces a more effective bearing contact between the pin and bushing than would exist if such wall thickness were uniform for the entire length of the bushing. Such variation in wall thickness also tends to compensate for the reduction of internal diameter occurring at the ends of the bushings when the latter are pressed into the plates 26.

While I prefer to use hardened steel balls as drifts, it is not essential that the drifts have a spherical form. Tapered drifts can be used; but in order to avoid excessive friction in the drifting operation the axial extent of that portion of a tapered drift having a diameter greater than the internal diameter of an undrifted bushing should not be too great. The diameter of the drift will depend upon the thickness of the stock from which the bushing is formed and should approximate the value determined by the following equation:

$$d = D - 1.94t + 0.003 \text{ inch}$$

in which $d$ is the diameter of a ball drift (or the maximum diameter of a tapered drift), $D$ is the diameter of the die-cavity, and $t$ is stock-thickness.

Figure 5:
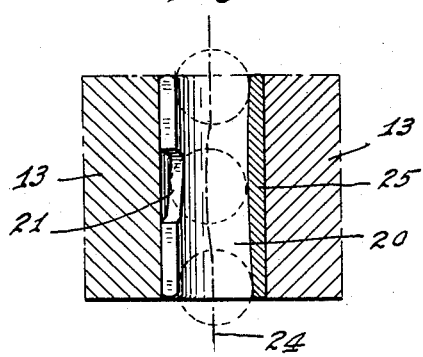
Fig. 5 is a view similar to Fig. 3 illustrating the drifting of a slotted bushing.

When the bushings are formed with slots 21, the ends of the slots are desirably tapered or rounded so that the extent of the relief provided by the slot will vary gradually as the drift is forced through the bushing. Such a gradual variation is of greatest importance when the ball is moving out of association with the slot; and for that reason, I prefer to employ a slot which has its maximum width nearer one end than the other, as shown in Figs. 4, 5 and 6, and to pass the drift through the bushing in such a direction that it comes first into association with that end of the slot closest to the point of greatest slot-width.

Chain rollers, such as indicated by the reference numeral 31 in Fig. 6, may be produced by a method essentially the same as that described above for the production of bushings, but in the manufacture of rollers the slots 21 are of course omitted.

As will be clear from Fig. 6, the relative disposition of two interconnected chain links will depend upon the thickness of the bushing at a point opposite the bushing-seam. By making possible an accurate control of such wall-thickness, my invention therefore facilitates accurate control of total chain-length.

I claim as my invention:

1. A method of producing an annular element for a power-transmission chain, comprising bending a metal blank to form it into a hollow cylinder, confining the cylinder to a predetermined diameter against radial expansion, and forcing through the cylinder while it is so confined a ball drift having the approximate diameter given by the equation:

$$d = D - 1.94t + 0.003 \text{ inch}$$

in which $d$ is the diameter of the drift, $D$ the external diameter of the confined cylinder, and $t$ the thickness of the metal.

2. A method of producing an annular element for a power-transmission chain, comprising bending a metal blank to form it into a hollow cylinder, confining the cylinder to a predetermined diameter against radial expansion, and forcing through the cylinder while it so confined a drift having the approximate diameter given by the equation:

$$d = D - 1.94t + 0.003 \text{ inch}$$

in which $d$ is the diameter of the drift, $D$ the external diameter of the confined cylinder, and $t$ the thickness of the metal.

3. A method as set forth in claim 2 in which the annular element is a roller-supporting chain bushing, the ends of said blank being provided with notches which complement each other in the finished bushing to form a slot in the bushing-wall.

References Cited in the file of this patent

UNITED STATES PATENTS

| | | |
|---|---|---|
| 1,466,953 | Loomis | Sept. 4, 1923 |
| 1,760,558 | Klocke | May 27, 1930 |
| 1,787,255 | Klocke | Dec. 30, 1930 |
| 1,816,474 | Eaton | July 28, 1931 |
| 1,845,122 | Briney | Feb. 16, 1932 |
| 1,910,221 | Klocke | May 23, 1933 |
| 1,925,055 | Mize | Aug. 29, 1933 |
| 1,991,988 | Spatta | Feb. 19, 1935 |
| 2,177,584 | Salansky | Oct. 24, 1939 |
| 2,213,302 | Buske | Sept. 3, 1940 |
| 2,778,094 | Whitney | Jan. 22, 1957 |

FOREIGN PATENTS

| | | |
|---|---|---|
| 107,213 | Austria | Sept. 10, 1927 |